UNITED STATES PATENT OFFICE.

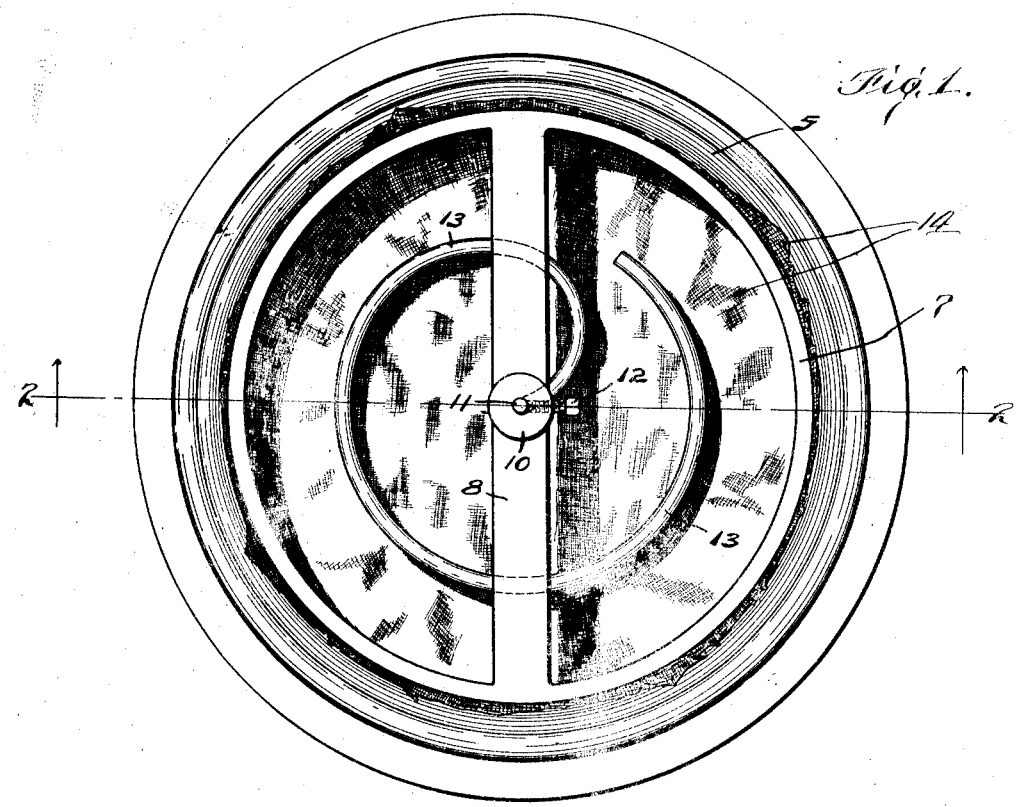

JOHN N. SHAW, OF SEATTLE, WASHINGTON.

COFFEE-URN.

1,341,285.  Specification of Letters Patent.  Patented May 25, 1920.

Application filed August 11, 1919. Serial No. 316,890.

*To all whom it may concern:*

Be it known that I, JOHN N. SHAW, a citizen of the United States, residing at Seattle, in the county of King and State of Washington, have invented a certain new and useful Improvement in Coffee-Urns, of which the following is a specification.

My invention relates to improvements in coffee urns and more particularly to improvements in the cloth receptacles that are adapted to be suspended in the upper portion of coffee urns to receive the ground coffee through which the water is poured in preparing the same and the object of my invention is to provide means for supporting a piece of cloth in bag-like shape in the upper portion of a coffee urn thereby avoiding the necessity of sewing the cloth into the form of a bag as is usually done before it can be used for this purpose.

A further object is to provide a device having means by which the size of the bag or coffee receptacle that is formed may be varied to suit the amount of coffee that is to be used.

A still further object is to provide a device that is so arranged and constructed as to prevent water from passing therethrough without passing through the ground coffee.

The invention consists in the novel construction, adaptation and combination of parts of a bag forming bag retaining device for a coffee urn as will be more clearly hereinafter described and claimed.

With coffee urns of the form commonly used in restaurants and similar places where coffee is made in large quantities it is customary to place the ground coffee into cloth bags that are formed with a hem around the open upper end and are adapted to have a circular wire hoop inserted within the hem which wire hoop serves to support the bag. My invention dispenses with the necessity of making bags and makes it possible to use a plain piece of cloth as a receptacle for the ground coffee and also provides means for adjusting the depth of the coffee receptacle.

I accomplish these objects by devices illustrated in the accompanying drawings, wherein—

Figure 1 is a plan view of a device constructed in accordance with my invention as it may appear when removed from the coffee urn; and Fig. 2 is a view in vertical section substantially on broken line 2, 2 of Fig. 1.

Referring to the drawings, throughout which like reference numerals indicate like parts, the numeral 5 designates a tapered cylindrical shell preferably formed of tin or similar metal and adapted to be removably suspended within the upper end of a coffee urn 20.

The shell 5 is provided at its bottom end with an inwardly directed upwardly curved flange 6 that forms an annular groove for the reception of the bottom edge of a circular cloth retaining member 7 which member 7 is provided with a diametrically arranged integral cross-bar 8 having a centrally disposed perforated boss 10 through which a straight shank 11 extends and is adjustably held by a set screw 12.

The bottom end of the shank 11 is bent or otherwise formed in the shape of a spiral foot member 13 that is preferably of smaller diameter than the retaining member 7 and that is adapted to engage with and hold a cloth 14 in an adjusted position as shown in Fig. 2.

The set screws 12, if desired, may be dispensed with as the weight of the foot member 13 will be sufficient to hold the cloth 14 in any desired position.

The size of the bag formed by that portion of the cloth that hangs below the shell 5 may be varied to suit the amount of coffee that is to be used therein by varying the position of the foot member 13.

The cloth 14 of any suitable piece of material is spread over the foot member 13 with its edges lapping over the retaining ring 7 which ring is then inserted in the receptacle 5 and pressed downwardly until the lower edge of such ring enters the annular groove formed by the curved flange 6 and securely clamps and holds the cloth 14. The ring 7 is provided on its upper edge with an outwardly directed annular flange 15 that fits snugly against the walls of the shell 5 and prevents water from passing downwardly around the outside of the ring 7.

The size of the bag can be adjusted so that the ground coffee will fill the bag up to or above the level of the bottom of the shell 5 thus insuring that hot water which may be poured into the top of the shell 5 will pass through the coffee and will not escape through the sides of the bag above the body of the ground coffee.

It is obvious that changes in the form of construction and arrangement of parts of my invention may be resorted to within the scope of the following claims.

What I claim is:

1. A device for forming a bag of variable size from a piece of cloth comprising a circular shell having an upwardly curved internal flange that forms an annular groove, a ring arranged to fit within said groove, a piece of cloth arranged to be held between said ring and said flange, a shank slidably disposed within said ring and a foot member on the end of said shank arranged to support said cloth.

2. The combination with a coffee urn, of a substantially cylindrical shell arranged to be removably supported within the upper portion of said urn said shell having an inwardly directed upwardly curved flange around its bottom end that forms an annular groove, a ring member arranged to rest within said groove, a cross-bar on said ring member said cross-bar having a perforation arranged centrally of said ring member and at right angles to the plane thereof, a shank movable through said perforation, an integral spiral foot member formed on the bottom end of said shank and arranged in a plane at right angles to said shank; and a cloth arranged to pass around said foot member and to be securely held between said ring and said shell.

In witness whereof, I hereunto subscribe my name this 2nd day of August, A. D. 1919.

JOHN N. SHAW.